United States Patent [19]

Bacardit

[11] 4,310,024
[45] Jan. 12, 1982

[54] CONTROL VALVE FOR FLUID ACTUATED DEVICE

[75] Inventor: Juan S. Bacardit, Barcelona, Spain

[73] Assignee: Bendiberica S.A., Barcelona, Spain

[21] Appl. No.: 162,214

[22] Filed: Jun. 23, 1980

[51] Int. Cl.³ .................... F16K 11/02; F15B 13/04
[52] U.S. Cl. .................... 137/625.21; 91/375 R
[58] Field of Search ............ 137/625.21, 625.22, 137/625.23; 91/375 R, 375 A, 372

[56] References Cited

U.S. PATENT DOCUMENTS 4,208,951 6/1980 Bacardit .................... 91/375 R
4,240,331 12/1980 Nishikawa .................... 137/625 UX

FOREIGN PATENT DOCUMENTS 1480666 6/1969 Fed. Rep. of Germany.
2009891 9/1970 Fed. Rep. of Germany.

*Primary Examiner*—Alan Cohan
*Attorney, Agent, or Firm*—Ken C. Decker; Paul David Schoenle

[57] ABSTRACT

A control valve comprised of a stator defining a discoidal chamber enclosing a star-shaped rotor, enclosures being defined between supply arms and discharge arms of the rotor respectively moving in front of fluid supply apertures and fluid discharge apertures and defining with said chamber variable supply passages and variable discharge passages, wherein the improvement consists of intermediate arms between each couple of supply and discharge arms, dividing the enclosure into two cavities, said intermediate arm cooperating and/or defining intermediate ports for variable communication between both cavities, one of which for providing pressure and the other for providing modulation.

6 Claims, 12 Drawing Figures

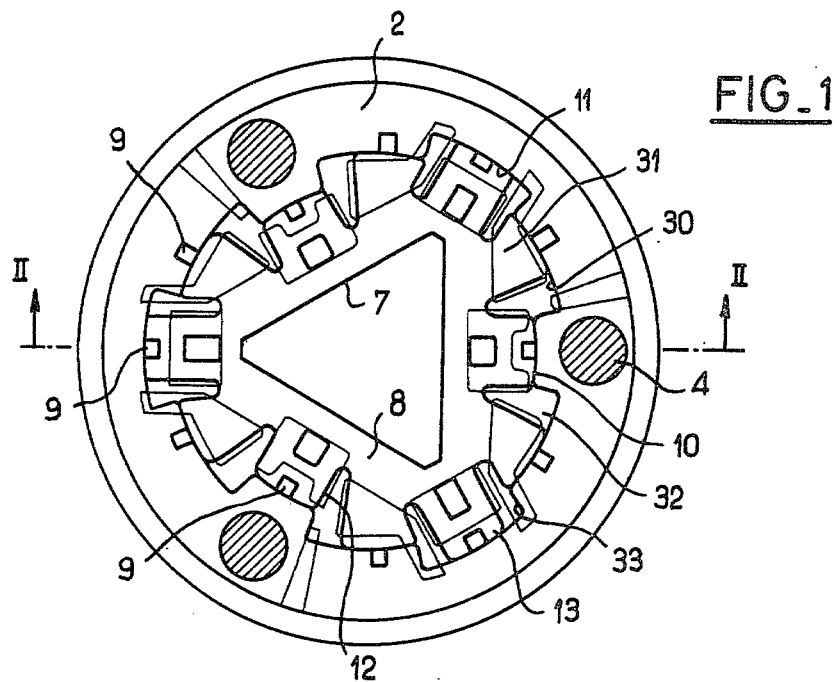
FIG_1
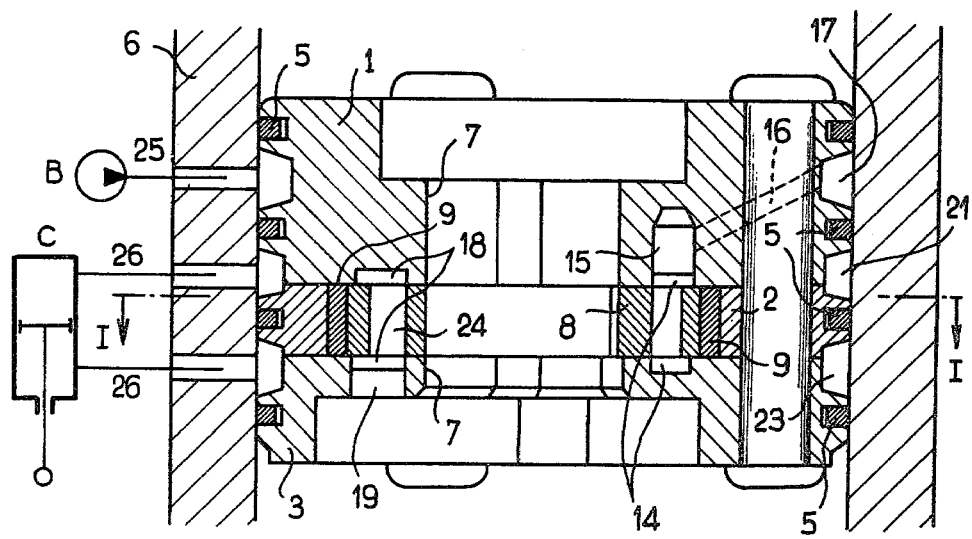
FIG_2

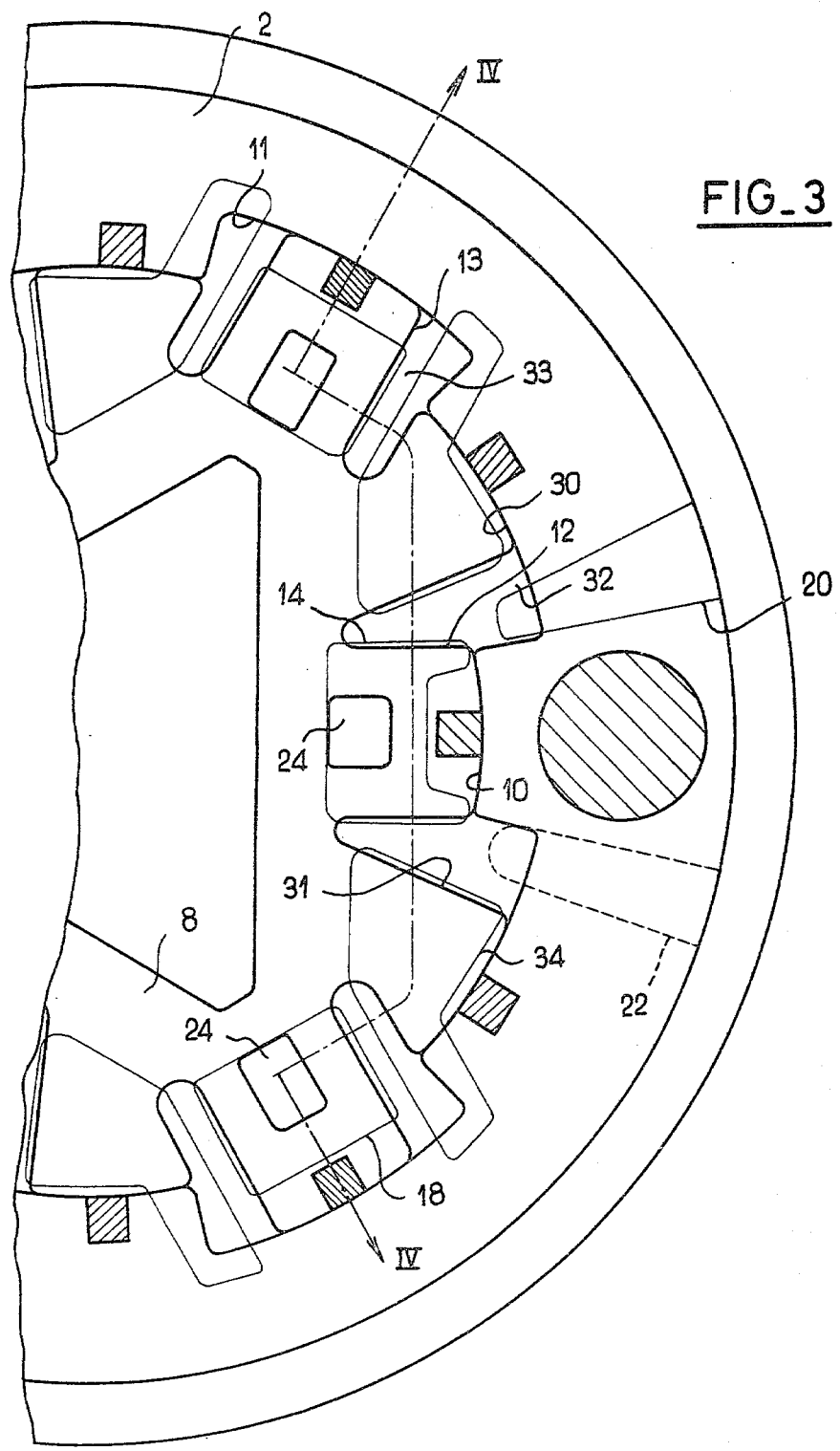
FIG_3

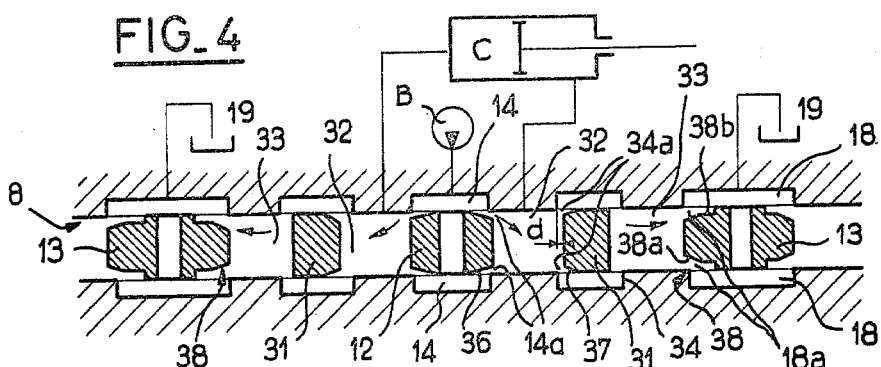
FIG_4
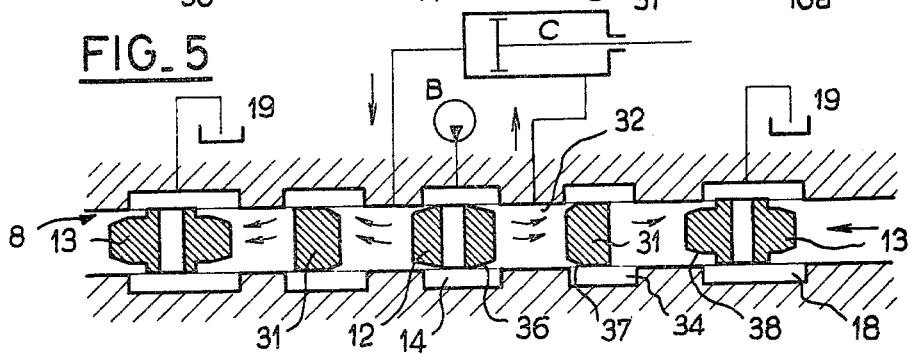
FIG_5
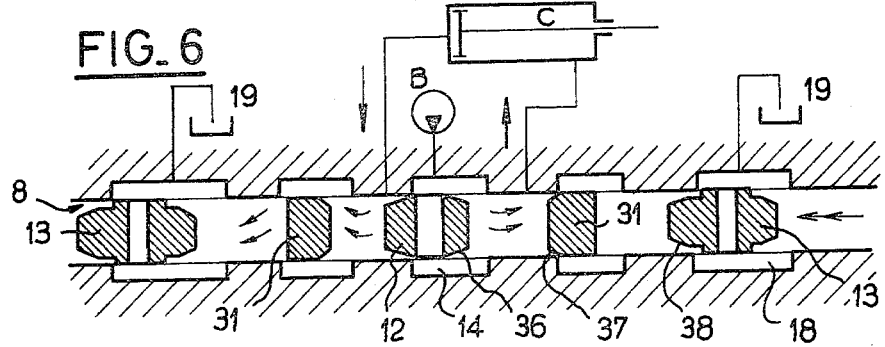
FIG_6
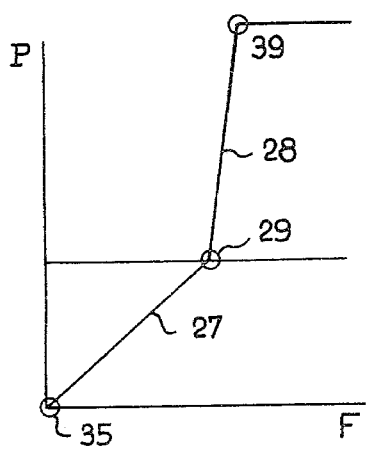
FIG_7

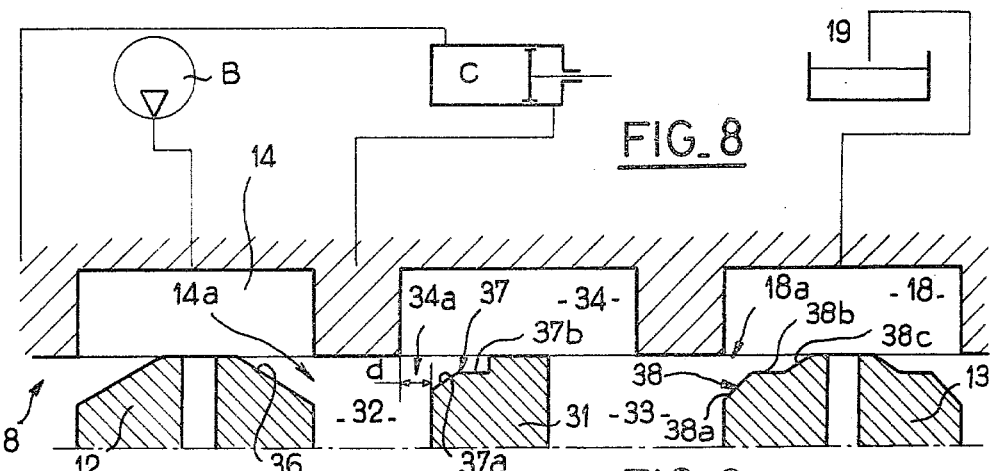
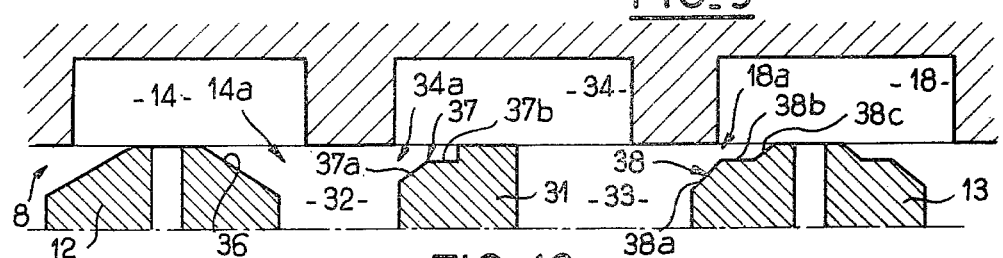
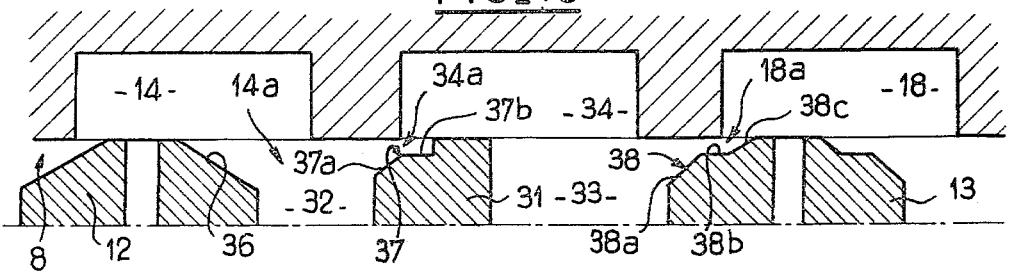
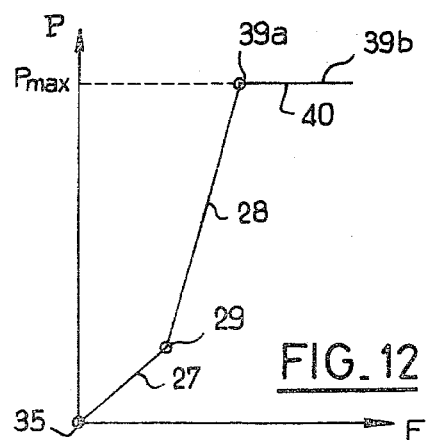

CONTROL VALVE FOR FLUID ACTUATED DEVICE

The present invention relates to a control valve for fluid actuated device and particularly to improvements in valve systems used for governing the operation of fluid-dynamic actuating devices, in particular double-acting devices, and relates more particularly to those used in power steering mechanisms for motor vehicles.

One known type of hydraulic control valve used for this purpose and which constitutes the object of previous applications by the present Applicant, comprises a discoidal chamber, or, in other words, a chamber which is cylindrical and the longitudinal axis of which is small compared to its diameter, made up in the form of a stator body, and a rotor which can rotate coaxially, at both sides of a central rest position, within the discoidal chamber thus forming an annular space between both parts, and which is provided with radial arms which divide this space into a plurality of separate compartments, with which respective ports match up, the latter being alternatively connected to the delivery and discharge of fluid under pressure, by virtue of the fact that the alternate compartments are connected to the respective chambers of a double-acting hydraulic cylinder which is to be actuated by means of the valve.

Rotation of the rotor to one side or the other away from the rest position isolates each one of the ports of the enclosure at the side corresponding to the sense of rotation, at the same time as when there is greatest communication between the port and the enclosure on the opposing side, so that the desired switching effect, is obtained in order to provide pressure at one of the chambers of the double-acting cylinder, and to provide for simultaneous discharge of the opposing one. The edges of the arms which perform the closing operation and the edges of the ports can be suitably designed in order to provide the desired law relating pressure provided by the value and the angular displacement of the rotor or of the turning moment applied to the same, but this arrangement is not adequate when there is a need to provide two differentiated relationships, for example, a small couple/pressure slope within the central operating region of the valve (in the case of power steering, when the vehicle is being driven more or less in a straight line) and a greater relationship between the two at the extremes of travel of the valve (when negotiating sharp bends or performing parking manoeuvres).

The present invention has the aim of improving hydraulic control valves of the type specified above, by providing them with the possibility of offering two couple/pressure relationships which are different within its operating range.

Consequently, the invention consists of a control valve for fluid dynamic actuating device of the type comprising a discoidal chamber forming a stator and having parallel end walls and a rotor in the form of a starwheel comprising substantially radial arms, which is rotatable within said chamber starting from an angular rest position and which defines within said chamber fluidically separated enclosures, some arms, respectively supply arms and discharge arms, being located so as to define ports having variable cross-section passages, respectively a supply passage connected to a fluid supply source and a discharge passage connected to a fluid discharge, said stator comprising conduits for connection to both chambers of an actuating cylinder, characterized in that said rotor is provided, between two contiguous supply and discharge arms, with an intermediate arm which divides the corresponding enclosure into two cavities, one of which for providing pressure is comprised between said pressure arm and said intermediate arm and in which one aforesaid conduit is opening up and the other cavity for providing modulation being comprised between said intermediate arm and said discharge arm, and that said intermediate arm is arranged to define intermediate ports with the facing portions of said end walls, said intermediate ports connecting the two aforesaid cavities and being provided with a variable cross-section passage, (the cross-section of which is equal to or greater than the cross-section of said discharge passage up to a determined angular position between rotor and stator from said rest position and decreases more than the cross-section of said discharge passage for a further relative rotation from this determined angular position.

The attached drawings show the scope of the present invention by way of non-limiting example and they show in diagrammatical form two preferred practical embodiments of the invention.

In the drawings:

FIG. 1 is a cross-sectional view of a discoidal valve which incorporates the improvements according to the invention, and taken through plane I—I of FIG. 2;

FIG. 2 is an axial cross-section of the same valve taken through plane II—II of FIG. 1;

FIG. 3 shows one portion of FIG. 1 at an enlarged scale;

FIG. 4 shows a development corresponding to cross-section IV—IV of FIG. 3 and which shows the valve in its rest position;

FIGS. 5 and 6 are views similar to FIG. 4 for two angular positions of operation of the valve;

FIG. 7 is a pressure vs couple plot of the operation of the valve;

FIG. 8 is similar to FIG. 4 of another embodiment but showing the development of only three arms of the rotor at a larger scale;

FIGS. 9 and 10 are views similar to FIG. 8 for two angular positions of operation of the valve; and FIGS. 11 and 12 are plots of the operation of embodiment of FIG. 8.

The valve stator is made up by an assembly of three discoidal pieces 1, 2 and 3, which are rigidly fixed by means of longitudinal fixing means 4, and are provided with sealing means 5 in order that they can be fitted inside an operating housing, shown by means of wall 6, and which may for example be the steering box of a motor vehicle provided with an hydraulic servo-mechanism. The pieces 1 and 3 have wide coaxial passages 7 in order to allow the operating body for rotor 8 to pass through which may, for example, be the operating shaft of the steering box. The rotor 8 is hermetically sealed against the adjacent faces of the pieces 1 and 3, and, using peripheral seals 9, to the internal surfaces of the intermediate piece 2.

The inner contour of the discoidal intermediate piece 2 has three cylindrical surfaces having a minor radius 10 and three cylindrical surfaces having a major radius 11, which alternate with the former; the rotor 8 has three short arms 12 called "supply arms" because they are facing fluid supply openings, the ends of which form a hermetic seal with the surfaces of minor radius 10, and three long arms 13 called "discharge arms" because they are facing fluid discharge openings, the ends of which form a seal with the surfaces 11. The facing surfaces of the pieces 1 and 3, which make up the axial walls or end walls of the discoidal chamber formed by pieces 1, 2 and 3, are provided with three depressions 14, which are similar in shape to the short arms 12 and are located in a position corresponding to the latter so that the corresponding extreme edges of both are adjacent as can be seen more clearly in FIG. 3 and, furthermore, the depressions 14 in the upper piece 1 are extended by means of blind passages 15 which communicate by means of radial conduits 16 with an annular channel 17, which is located between the two upper sealing parts 5 of the valve body. Depressions 14 and supply arms 12 cooperate to define ports having variable cross-section passages 14a called "supply passages" (see FIG. 4). In a similar manner the surfaces of the pieces 1 and 3 which face and correspond to the long arms 13 of the rotor have depressions 18 which maintain, with respect to arms 13, the same relationships described when reference was made to arms 12; the depressions in the lower piece 3 are extended by passages 19 which issue out to the outside of the valve body. Depressions 18 and discharge arms 13 cooperate to define ports having variable cross-section passages 18a called "discharge passages" (see FIG. 4). At one side of each supply arm 12, the upper surface 1 has a radial groove 20 which communicates the corresponding enclosure of the valve with the annular channel 21 which is formed between the two intermediate seals 5, and on the other side of each one of the said arms, the lower piece 3 has a radial groove 22 which communicates with an annular channel 23, which is sealed off by the lower sealing parts.

Everything that has been said up until now concerning the construction is more or less conventional: the arms having differing radii are intended to provide the valve with a reaction effect which is proportional to the effort performed, and the passages 24 are provided for compensating the pressures between the two faces of the arms of the rotor. The annular channel 17 is connected, by means of conduits 25, to the fluid pressure source B able to provide for fluid under pressure; the channels 21 and 23 connected to the respective chambers of the double-acting actuating cylinder C, using conduits 26, and the passages 19 are connected to the fluid discharge. With the valve in the rest position shown in FIGS. 3 and 4, ignoring the intermediate arms which have not yet been described, fluid under pressure which arrives at the depressions 14 is equally distributed to the enclosures on both sides of the short arms and escapes to the discharge through the depressions 18, so that the pressure existing in the two chambers of cylinder C, which are connected to these enclosures, are approximately equal and the system is held in a stationary state; when there is a displacement of the short arms 12 to one or the other side of the position shown, the enclosure which is located upstream with respect to the direction of displacement remains in direct communication with the fluid entry by means of depressions 14 and is isolated from the fluid discharge by means of the adjacent long arm 13, whilst the enclosure located downstream is isolated from the fluid entry by the short arm and is in direct communication with the discharge via the corresponding depressions 18; when the rotor is caused to turn in the opposite sense, these effects are reproduced in a symmetrical manner This operating mode can be represented by line 27 on the graph shown in FIG. 7, which shows the fluid pressure P which is present in the respective output conduit 26 as a function of the couple F which is applied to the rotor of the valve, for a determined nominal pressure of the fluid supply under pressure. The slope of line 27 gives an idea of the magnitude of the force which it is necessary to apply to the valve in order to obtain a certain force on the steering mechanism, and this is considered to be adequate for normal running conditions and when performing turns of large radius. Nevertheless, it is current practice to provide means for reducing the relationship between F and P, or in other words, for increasing the output pressure for a definite applied couple, in order to facilitate turning of the vehicle through tight radii or when performing manoeuvres with the vehicle parked. This fresh relationship is shown, for example, by line 28, having a more pronounced slope and which cuts line 27 at a point 29, where the transition from one operating mode to the other has been automatically produced in both senses.

Previously, this effect was obtained, for example, in accordance with previous applications by the present Applicant, by employing auxiliary valve devices, which are actuated in a corresponding manner by the rotor itself or the shaft which actuates the rotor, and the present invention attempts to simplify these means and eliminate the causes of failure to which they may be subject.

In order to provide for this the inside periphery of the stator or intermediate part 2 is provided with six segments 30 having an identical cylindrical surface which is arranged coaxially with respect to surfaces 10 and 11, each one of the former being arranged between each pair of the latter. The rotor, in its turn, is provided with six intermediate arms 31, the ends of which form a hermetic seal, using the respective seals 9, with these surfaces 30, so that the enclosures which, in previous embodiments, were limited by each pair of long and short arms 12 and 13, are now divided into individual pairs of cavities 32 and 33, the first of which, the pressure cavity 32 for providing pressure to one chamber of the cylinder C, is adjacent to the short arm 12 and is adapted to communicate with the fluid supply through passages 14a, and the second of which, the discharge cavity 33 for providing modulation is adjacent to the long arm 13 and is adapted to be connected to a free discharge of fluid by means of passages 18a. Additionally, the grooves 20 and 22 which are connected by means of channels 21 and 23 and conduits 26 to the respective chambers of the operating cylinder C, are located in a position adjacent to the rest position of each short arm 12 and are opening up into pressure cavities 32 on both sides of said short arm. Furthermore, one or both facing surfaces of the two parts 1 and 3 which constitute part of the valve body, are provided with six depressions 34 which in the rest position of the valve are located so as to face the respective intermediate arms 31 and to define therewith intermediate ports provided with variable cross-section passages 34a (see FIG. 4). The arrangement of the whole assembly will be better understood from the diagrams showing the various stages of operation of the valve, shown in FIGS. 4 to 6. The intermediate ports thus connect cavities 32, 33. Moreover, the supply passages 14a are defined by the cooperation of edges of depressions 14 and chamfer means 36 on arms 12, the discharge passages 18a are defined by the cooperation of edges of depressions 18 and chamfer means 38 and the variable cross-section passages 34a are defined by the cooperation of edges of depressions 34 and chamfer means 37.

FIG. 4 represents the rest position of the valve corresponding to the origin 35 of the graph shown in FIG. 7. It will first of all be noticed that the arrangement of parts 13, 31 is symmetrical on both sides of one particular short arm 12, and it will be clear that fluid under pressure which arrives from the pump B at depressions 14 will become equally distributed at both sides of the said short arm in its rest position and will pass to the discharge 19 whilst passing through the valve devices constituted by the arms 31 and 13 and their respective passages (34a, 18a), so that the two pressure chambers 32 on both sides of each short arm 12 are subject to the same fluid pressure and the operating cylinder C remains in its central rest position, shown in FIG. 4.

The chamfers means 36 and 38 of the short and long arms 12 and 13 are shaped in the usual manner so as to provide the relationship shown by the line 27 in FIG. 7, and the chamfer means 37 of the intermediate arm 31 is located so that it is at a position corresponding to a less advanced stage in the operating process, based on the sense of operation (FIG. 4), with respect to the chamfer means 38 of the long arm 13; furthermore, this chamfer 37 is shaped so as to provide the relationship indicated by the line 28 in FIG. 7. In other words, the cross-section of passages 34a is equal to or greater than the cross-section of discharge passages 18a up to a determined angular position (illustrated by FIG. 5) between rotor and stator from said rest position and decreases more than the cross-section of said discharge passages for a further relative rotation (see FIG. 6) from this determined angular position.

As a result of this, when the valve is operated in such a way as to cause rotor 8 to become displaced in the direction indicated by the arrow in FIG. 5, operating conditions are provided which correspond to various points on the line 27 starting from its origin 35. Since, initially, the cross-section for passage of fluid corresponding to chamfer means 37 is greater than that provided by chamfer means 38, the former will not affect the conditions for flow of fluid oil under pressure and the system behaves as if the intermediate arms 31 were not present, in accordance with the line 27 in the graph. This is due to the fact that in the rest position (FIG. 4) the spacing d between the outermost edge of chamfer means 37 and the facing edge of its corresponding depression 34 is greater than the spacing (substantially a zero spacing) between the outmost edge of chamfer means 38 and the confronting edge of its corresponding depression 18. It is to be noted that the term "spacing" in fact designates the distance between projections of said edges on a common radial plane of the valve (as illustrated by FIG. 4) and not the distance between said edges which is not zero for passages 18a on FIG. 4.

Point 29 in the relationship of F/P is reached when the chamfer means 37 starts to block off the passage of fluid, and from this point on, the rotating couple applied to the rotor of the valve continues to increase, the flow of oil is checked by chamfer 37 and the pressure in pressure chamber 32 increases more rapidly, in accordance with the characteristics described by line 28, until point 39 is reached, which corresponds to the nominal pressure for supply of the system; cylinder C, which is connected to the said chamber 33, is now behaving in accordance with the characteristics represented by line 28. This is due to the fact that the chamfer means 37 is comprised of substantially a single bevelled surface (in embodiment of FIGS. 4–6) whereas the chamfer means 38 of the discharge arm 13 comprise a bevelled portion 38a and a portion 38b parallel to the end walls of the discoidal chamber forming the housing of the rotor 8. Thus, for a further rotation from the position illustrated on FIG. 5 (corresponding to point 29) the cross-section of passage 18a remain substantially constant so that the pressure in cavity 33 remains substantially constant whereas the pressure in cavity 32 is still growing thus providing for the characteristics of operation described by line 28. To the left of arm 12 (FIG. 5), there is a free passage for fluid.

The same manner of operation is repeated symmetrically with respect to what has been described, when rotor 8 is operated in the opposite sense.

Referring now to FIGS. 8–12, another embodiment is shown with improved chamfer means. On FIG. 8, the rotor and the stator are shown in the rest position similarly to FIG. 4, although with a large scale, and the same reference numerals are used to designate the same parts of the device. According to this improvement, the chamfer means 37 of the intermediate arm 31 comprises a bevelled portion 37a and a portion 37b substantially parallel to the end walls of the discoidal chamber forming the housing of the rotor 8 whereas the chamfer means 38 of the discharge means 13 comprises two bevelled portions 38a, 38c separated by a portion 38b substantially parallel to said end walls. The result of this arrangement, in operation, is shown by FIGS. 9, 10 and, for instance, by the plot of FIG. 11. For operating conditions, between positions illustrated by FIGS. 8 and 9 and corresponding to line 27 on FIG. 11, the initial spacing d is diminishing but the cross-section of passage 34a remains substantially constant whereas the cross-section of passage 18a is diminishing to provide the desired couple/pressure characteristics of line 27 up to point 29 corresponding to the position of the rotor on FIG. 9. For a further relative rotation (between FIGS. 9 and 10), the cross-section of passage 34a is diminishing (due to bevelled portion 37a) whereas 38b. Consequently, the pressure in cavity 32 is still growing whereas it remains substantially constant in cavity 33 so that the reaction coupled generated in cavity 33 does not grow as it does in cavity 32 and the total pressure/couple characterstics becomes that of line 28 in FIG. 11 up to point 39a corresponding to the position of rotor 8 illustrated on FIG. 10 and provided that the valve is designed so that the corresponding pressure Pa is less than the maximum pressure Pmax of the system (for instance limited by a pressure regulator not shown). Line 28 corresponds to a greater assistance for instance for parking manoeuvres if the valve is used in a power steering system. For a further relative rotation after the position of the rotor illustrated on FIG. 10, the pressure growing is one more time controlled by reducing the cross-section of passage 18a so that pressure grows in cavity 33 as well as the reaction coupled created in this cavity. The result is a loss of the slope of the curve of FIG. 11 between points 39a, 39b, the latter corresponding to the maximum pressure Pmax. This portion (line 40) in the pressure/couple characteristics has two advantages. Firstly, it provides for an increasing of reaction of the driving wheel (in case of a power sterring system) warning the driver that the system approaches of its extreme operation conditions. Secondly the operation of the valve in this zone of extreme operation conditions is highly improved because the above improvement in chamfer means eliminates the risk of operation instability. In case the valve is designed so that the maximum pressure Pmax is reached substantially for the situation illustrated on FIG. 10, the resulting pressure/couple characteristic is illustrated by FIG. 12, that is with line 40 having a zero slope. In this case, only the second advantage (elimination of operation instability) subsists.

It is obvious that the number of sets of arms 12, 31 and 13 can be varied depending on the requirements of each particular application. When it is necessary to operate single-acting devices, it is possible to discard one of the symmetrical halves of the unit described. Alterntively, if it is technically possible, it is possible to provide more than one intermediate arm 31 between each two short and long arms 12 and 13 together with the respective intermediate depressions, and to dimension the various pairs of bevelled edges or chamfers providing closing, in order to obtain operating relationships which are additional to those shown in the graph by lines 27 and 28. Also, it is possible to provide pressure arms 13 and intermediate arms 31 with equal radial lengths thus eliminating hydraulic reaction in pressure cavities 32 which provide for a very important assistance of the power steering for parking manoeuvres (line 28 is substantially vertical).

Finally, those constructional details and other constructional characteristics which are not essential for putting the invention into practice are independent of the object of the present invention and all these are comprised within the scope of the following claims.

I claim:

1. Control valve for fluid dynamic actuating device of the type comprising a discoidal chamber forming a stator (1,2,3) and having parallel end walls and a rotor (8) in the form of a starwheel comprising substantially radial arms, which is rotatable within said chamber starting from an angular rest position and which defines within said chamber fluidically separated enclosures, some arms, respectively supply arms (12) and discharge arms (13), being located so as to define ports having variable cross-section passages, respectively a supply passage (14a) connected to a fluid supply source (B) and a discharge passage (18a) connected to a fluid discharge (19), said stator comprising conduits (20, 21, 22, 23) for connection to both chambers of an actuating cylinder (C), characterized in that said rotor (8) is provided, between two contiguous supply and discharge arms, with an intermediate arm (31) which divides the corresponding enclosure into two cavities, one of which (32) for providing pressure is comprised between said supply arm and said intermediate arm and in whicn one aforesaid conduit is opening up and the other cavity (33) for providing modulation being comprised between said intermediate arm and said discharge arm, and that said intermediate arm is arranged to define intermediate ports (34, 34a) with the facing portions of said end walls, said intermediate ports connecting the two aforesaid cavities and being provided with a variable cross-section passage (34a), the cross-section of which is equal to or greater than the cross-section of said discharge passage (18a) up to a determined angular position between rotor and stator from said rest position and decreases more than the cross-section of said discharge passage for a further relative rotation from this determined angular position.

2. Control valve for fluid dynamic actuating devices in accordance with claim 1, characterized in that the intermediate ports (34, 34a) comprise depressions (34) provided in said end walls of the discoidal chamber at a position corresponding to at least one of the axial faces of the intermediate arms (31).

3. Control valve for fluid dynamic actuating devices in accordance with claim 2, characterized in that the depressions (34) have terminal edges, based on the direction of displacement of the arms (31) which are designed to provide a sealed relationship with respect to complementary sealing edges provided on the said arms.

4. Control valve according to claim 2, in which said ports (14, 14a, 18, 18a) defined with said supply arms (12) and discharge arms (13) also comprise depressions (14, 18) provided in said end walls of said discoidal chamber and in which the variable cross-section passages (14a, 18a) thereof are defined by the cooperation of edges of those depressions with corresponding chamfer means 36, 38) on said respective arms, characterized in that each intermediate arm (31) also comprises chamfer means (37) defining in cooperation with one edge of at least one corresponding aforesaid depression (34), the variable cross-section passage (34a) of the intermediate port and that, in said rest position the spacing (d) between the outermost edge of said chamfer means of said intermediate arm and the edge of its corresponding depression is greater than the spacing between the outermost edge of the chamfer means (38) of said discharge arm (13) and the edge of its corresponding depressions.

5. Control valve according to claim 4, characterized in that the chamfer means (37) of said intermediate arm is comprised of substantially a single bevelled surface whereas the chamfer means (38) of the discharge arm comprise a bevelled portion (38a) and a portion (38b) parallel to said end walls of said discoidal chamber.

6. Control valve according to claim 4, characterized in that the chamfer means (37) of said intermediate arm (31) comprises a bevelled portion (37a) and a portion (37b) substantially parallel to said end walls of said discoidal chamber and that the chamfer means (38) of said discharge arm (13) comprises two bevelled portions (38a, 38c) separated by a portion (38b) substantially parallel to said end walls of said discoidal chamber.

* * * * *